(12) United States Patent
Day et al.

(10) Patent No.: US 11,378,375 B2
(45) Date of Patent: Jul. 5, 2022

(54) MEASURING TAPE WITH TRANSVERSE LOCATING APERTURE

(71) Applicant: APEX BRANDS, INC., Apex, NC (US)

(72) Inventors: Adam Day, Apex, NC (US); Jonathan Beckwith, Charlotte, NC (US); Adam Baxter, Apex, NC (US); Vlad Patrangenaru, Ellicott City, MD (US)

(73) Assignee: APEX BRANDS, INC, Apex, NC (US)

( * ) Notice: Subject to any disclaimer, the term of this patent is extended or adjusted under 35 U.S.C. 154(b) by 0 days.

(21) Appl. No.: 17/043,340

(22) PCT Filed: Apr. 2, 2019

(86) PCT No.: PCT/US2019/025331
§ 371 (c)(1),
(2) Date: Sep. 29, 2020

(87) PCT Pub. No.: WO2019/195246
PCT Pub. Date: Oct. 10, 2019

(65) Prior Publication Data
US 2021/0025685 A1 Jan. 28, 2021

Related U.S. Application Data

(60) Provisional application No. 62/651,318, filed on Apr. 2, 2018.

(51) Int. Cl.
*G01B 3/1071* (2020.01)
*G01B 3/1089* (2020.01)
(Continued)

(52) U.S. Cl.
CPC ............ *G01B 3/1071* (2013.01); *B25H 7/04* (2013.01); *G01B 3/1041* (2013.01); *G01B 3/1056* (2013.01); *G01B 3/1089* (2020.01)

(58) Field of Classification Search
CPC .. G01B 3/1071; G01B 3/1089; G01B 3/1041; G01B 3/1056; B25H 7/04
(Continued)

(56) References Cited

U.S. PATENT DOCUMENTS 3,036,791 A  5/1962  Siggelkow
4,744,150 A  5/1988  Horvath
(Continued)

FOREIGN PATENT DOCUMENTS

CN  202630827 U  12/2012
EP  2955476 A1  12/2015
KR  910007788 A  5/1991

OTHER PUBLICATIONS

International Search Report and Written Opinion from related international application No. PCT/US2019/025331 dated Jun. 17, 2019, all pages cited in its entirety.
(Continued)

*Primary Examiner* — Yaritza Guadalupe-McCall
(74) *Attorney, Agent, or Firm* — Burr & Forman LLP

(57) ABSTRACT

A measuring tape device may include a housing having an aperture, a reel assembly defining an axis, a blade having a first end configured to extend from the housing through the aperture and a second end configured to be wound on the reel assembly, and a transverse aperture extending through the housing in a direction substantially parallel to the axis.

17 Claims, 3 Drawing Sheets

(51) Int. Cl.
*G01B 3/1041* (2020.01)
*G01B 3/1056* (2020.01)
*B25H 7/04* (2006.01)

(58) Field of Classification Search
USPC .................................................. 33/758, 769
See application file for complete search history.

(56) References Cited

U.S. PATENT DOCUMENTS

| | | | |
|---|---|---|---|
| 4,856,726 A | 8/1989 | Kang | |
| 6,658,755 B2 * | 12/2003 | Arlinsky | G01B 3/1041 33/760 |
| 6,698,104 B2 * | 3/2004 | Scarborough | G01B 3/1084 33/768 |
| 6,701,636 B2 * | 3/2004 | Scarborough | G01B 3/1041 33/768 |
| 6,978,553 B2 * | 12/2005 | Doublet | G01B 5/245 33/1 G |
| 7,222,437 B2 * | 5/2007 | Spanski | G01B 3/1084 33/760 |
| 8,056,849 B2 * | 11/2011 | Ng | B65H 75/4447 242/378.2 |
| 2002/0088135 A1 * | 7/2002 | Arlinsky | G01B 3/1084 33/760 |
| 2006/0265891 A1 * | 11/2006 | Murphy | G01C 9/28 33/379 |
| 2007/0266575 A1 * | 11/2007 | Nash | G01C 17/24 33/355 R |
| 2013/0025147 A1 | 1/2013 | Steele et al. | |
| 2013/0055578 A1 * | 3/2013 | Johns | G01B 3/1084 33/760 |
| 2015/0211834 A1 * | 7/2015 | Dalquist | G01B 3/1084 33/760 |
| 2017/0292821 A1 | 10/2017 | DeLeo et al. | |
| 2021/0025685 A1 * | 1/2021 | Day | G01B 3/1071 |

OTHER PUBLICATIONS

Office Action from related Chinese Application No. 201980031117.7 dated Sep. 15, 2021, all pages cited in its entirety.

* cited by examiner

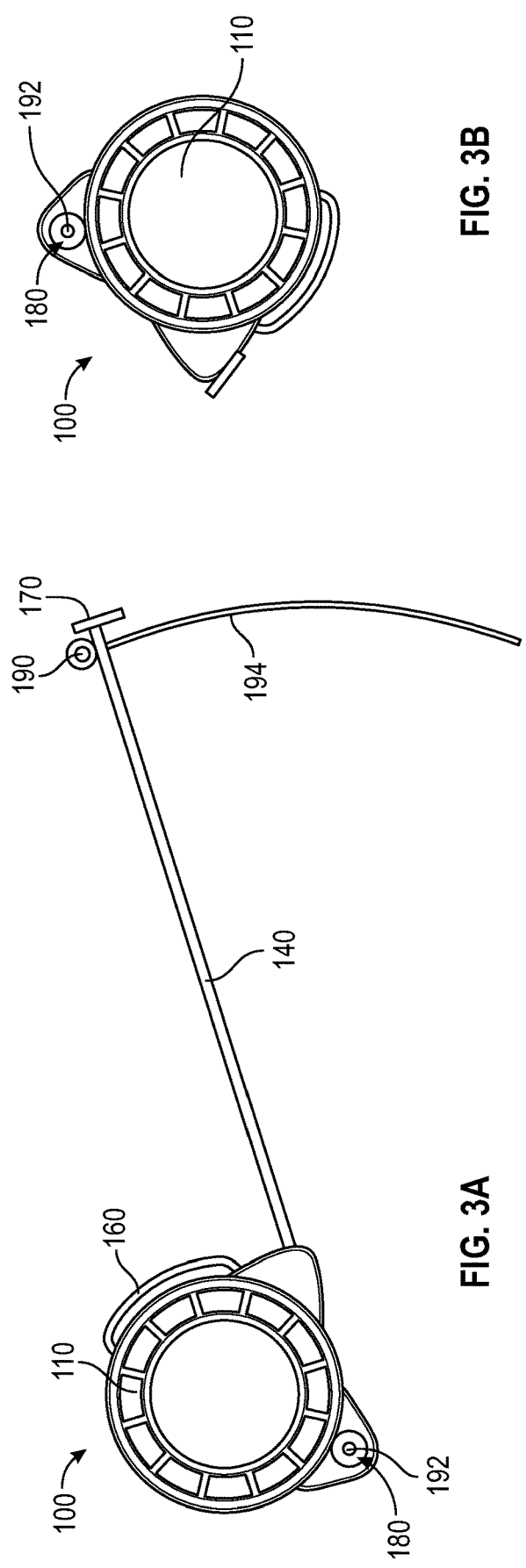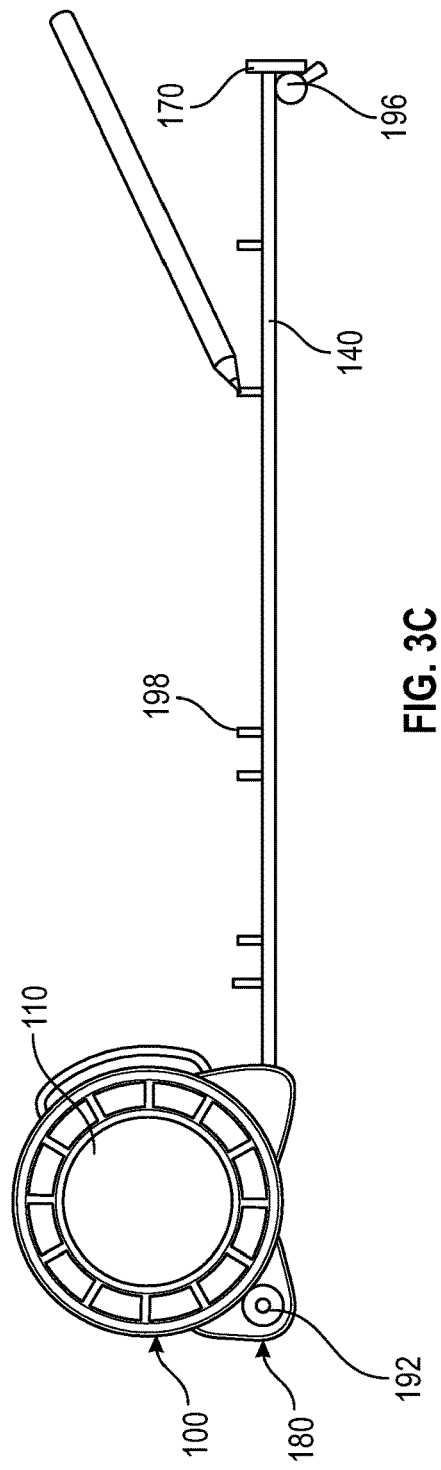

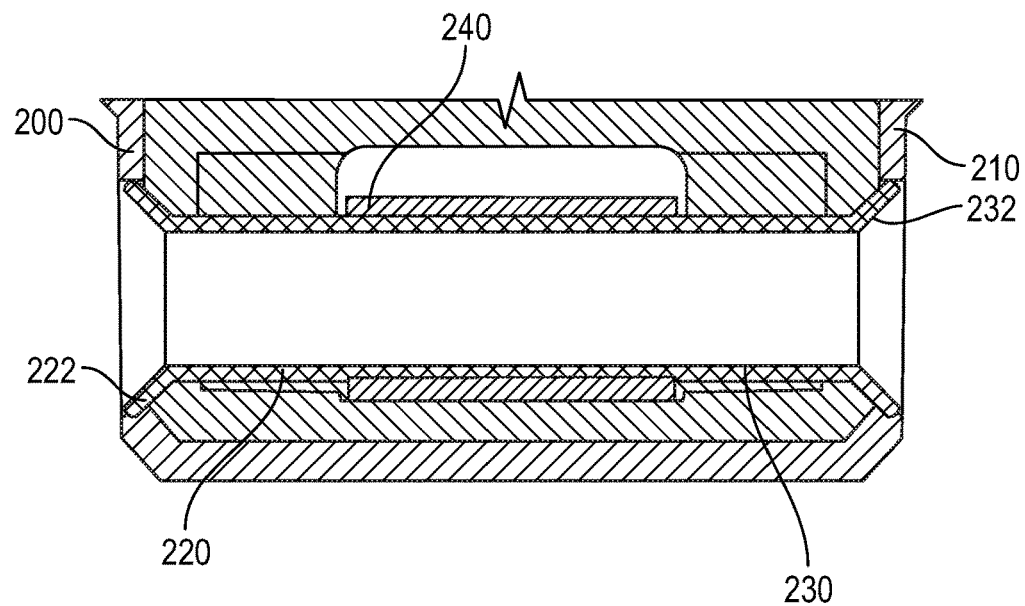
FIG. 4
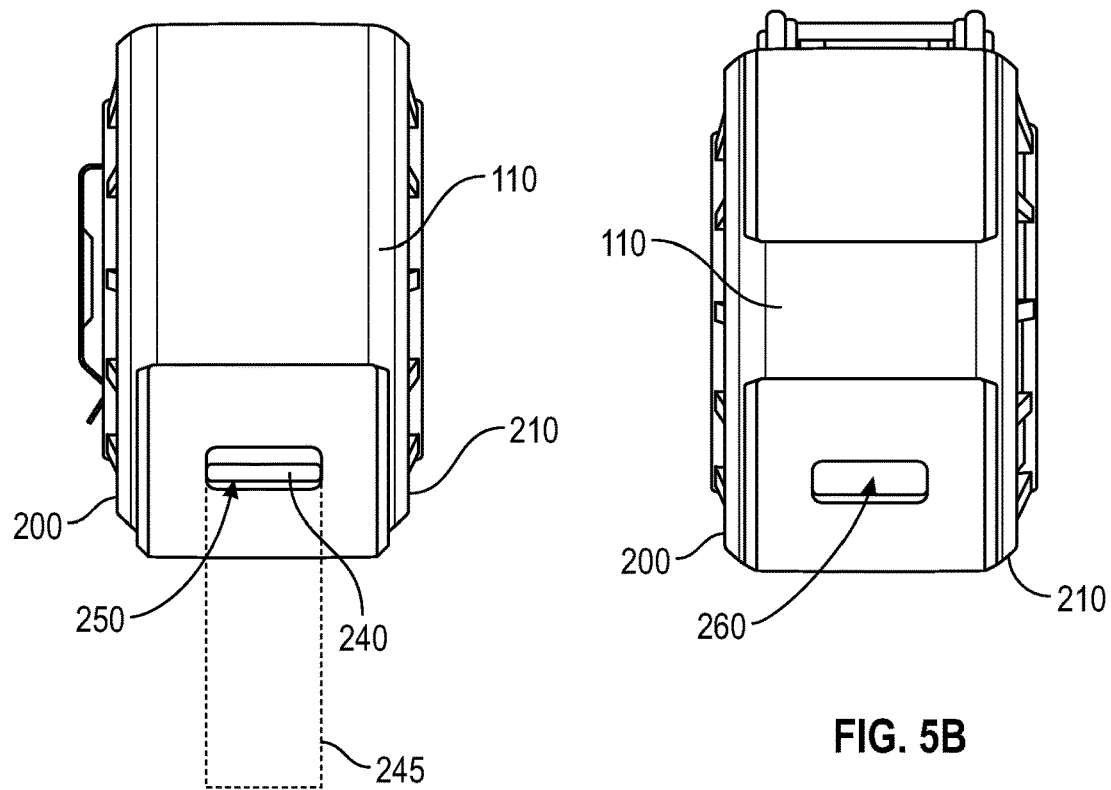
FIG. 5A
FIG. 5B

MEASURING TAPE WITH TRANSVERSE LOCATING APERTURE

CROSS REFERENCE TO RELATED APPLICATION

This application claims priority to U.S. application No. 62/651,318 filed Apr. 2, 2018, the entire contents of which are hereby incorporated by reference in its entirety.

TECHNICAL FIELD

Example embodiments generally relate to measuring tape devices, and particularly relate to a measuring tape that has a transverse locating aperture.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

For nearly a century, metallic tape ribbons with a curved and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. By employing an end hook at one end of the tape, the user may take advantage of the standout to pay out the measuring tape toward an anchor point on a media that is to be measured and then conduct the measurement without having to physically move to the anchor point to affix the end hook and then move away to make the measurement.

However, the rigidity or stiffness of the tape, which contributes to the standout capability, might create other potential uses for the measuring tape device if not for the rigidly enclosed housing that is commonly employed. Thus, having a measuring tape device with a more flexible and useful structure, can be very attractive to consumers.

BRIEF SUMMARY OF SOME EXAMPLES

Some example embodiments may enable the provision of a measuring tape that has a transverse locating aperture. The operator may be enabled to configure the measuring tape for a number of different particular purposes for which the operator intends to use the measuring tape, which are not otherwise possible with a conventional measuring tape. This configurability may improve the user experience associated with use of the measuring tape.

In an example embodiment, a measuring tape device is provided. The measuring tape device may include a housing having an aperture, a reel assembly defining an axis, a blade having a first end configured to extend from the housing through the aperture and a second end configured to be wound on the reel assembly, and a transverse aperture extending through the housing in a direction substantially parallel to the axis.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 3A illustrates the measuring tape device pivotally secured to a surface to enable marking of an arc in accordance with an example embodiment;

FIG. 3B illustrates the measuring tape device being stored by hanging on the surface in accordance with an example embodiment;

FIG. 3C illustrates the measuring tape device being used in a straight-edge mode in accordance with an example embodiment;

FIG. 4 illustrates a cross section view taken through an axis of a transverse aperture in accordance with an example embodiment;

FIG. 5A illustrates a back view of the measuring tape device to show a lanyard slot in accordance with an example embodiment; and FIG. 5B illustrates a bottom view of the measuring tape device to show another lanyard slot in accordance with an example embodiment.

DETAILED DESCRIPTION

Figure 1:
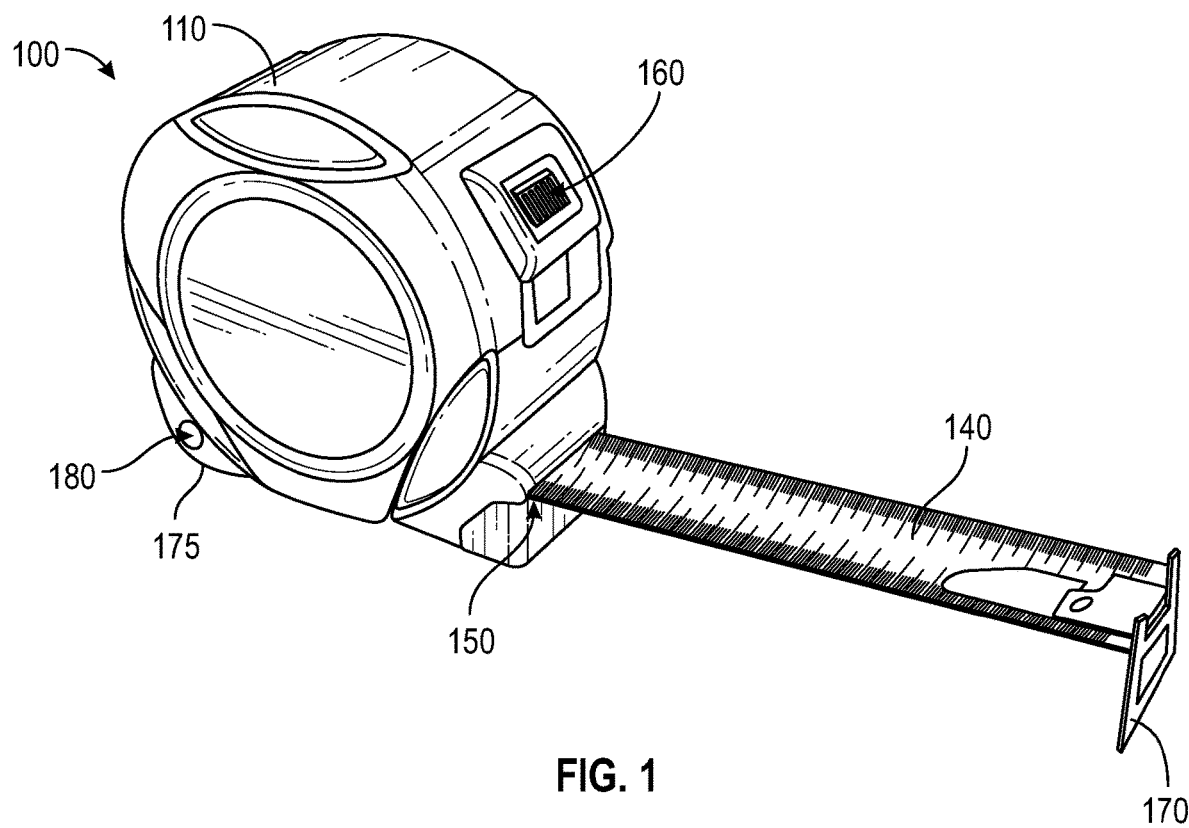
FIG. 1 illustrates a perspective view of a measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved configuration by including a transverse locating hole. This is accomplished by enabling the providing a transverse hole or aperture through the housing of the measuring tape device at a particular location on the housing to enable the measuring tape device to be configurable to various different configurations instead of merely providing a single monolithic configuration. FIG. 1 illustrates a perspective view of a measuring tape device, and FIG. 2 illustrates a block diagram of such device, in accordance with an example embodiment.

Figure 2:
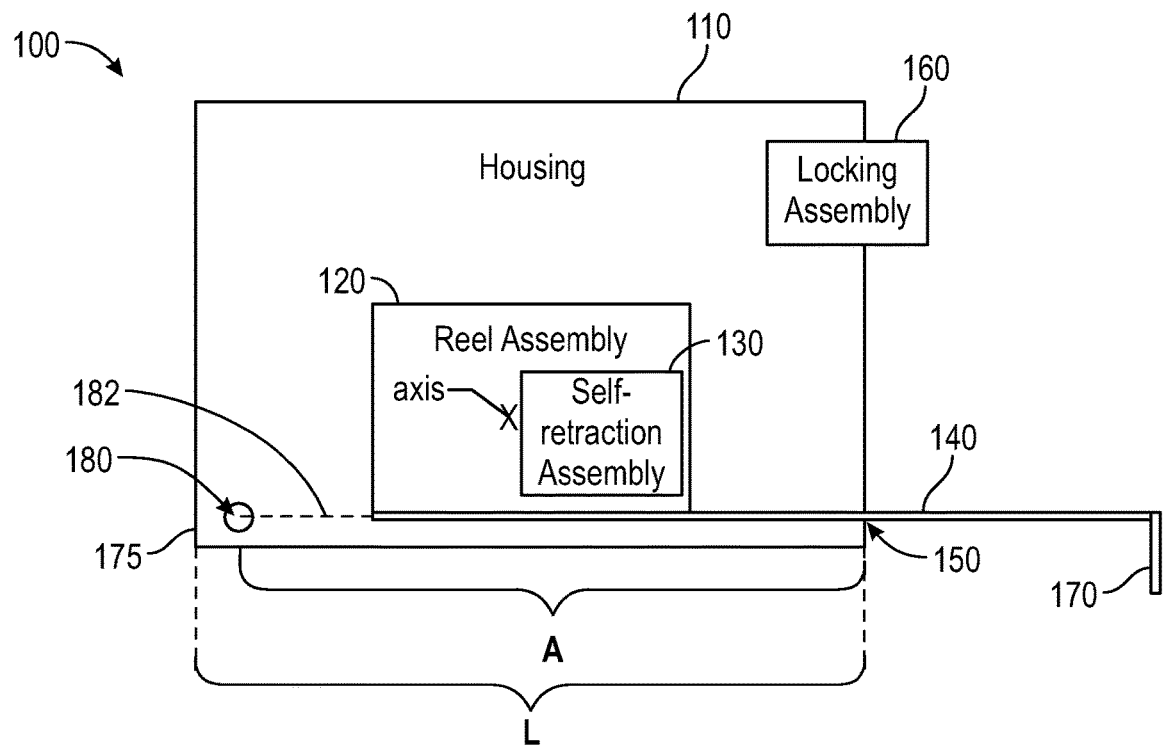
FIG. 2 illustrates a block diagram of the measuring tape device in accordance with an example embodiment.

Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. Although not required, in some cases, a locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140 when longer lengths are extended). The blade 140 can be extended in a guided fashion toward an intended target anchor point while the blade 140 continues to have sufficient rigidity to standout. When the blade 140 has been extended to allow the end hook 170 to engage the anchor point, or when the operator manually places the end hook 170 at the anchor point, the blade 140 can be extended to perform any intended measurements so long as the end hook 170 remains fixed at the anchor point. In some cases, the length (L) of the housing 110 may be a known distance. Moreover, in some cases, the length (L) may be printed on the housing 110 so that the operator can back the housing 110 up against a surface and add the known length (L) to the distance aligned with the aperture 150 to get the total distance from the surface against which the housing 110 is backed and another surface or anchor point at which the end hook 170 is affixed or otherwise located proximate to. To facilitate the accuracy of measuring in this way, a heel portion 175 may be defined at a portion of the housing 110 that is located substantially opposite relative to the aperture 150. The heel portion 175 may, together with one or more other portions of the housing 110, form a structure that, when engaged with a surface that lies in a reference plane, aligns the housing 110 such that the blade 140 extends from the aperture 150 in a direction that is substantially perpendicular to the reference plane.

For a typical, flat piece of media that is being measured, the blade 140 (which generally has a shallow U-shaped cross section) lays across the media and the end hook 170 engages the anchor point such that the media and the anchor point are both below the blade 140 (or at least on the same side of the blade 140). However, it is possible that measurements may be desirable in other orientations for the blade 140 and the end hook 170. To attempt to accommodate other orientations, the end hook 170 could, for example, extend (or be extended) beyond the transverse edges of the blade 140 to allow an anchor point disposed on one of the sides of the blade 140 to be engaged. This may add some amount of flexibility to the functioning of the end hook 170, but it may not suffice for other situations. Moreover, the end hook 170 may additionally or alternatively be provided with an ability to interface with other items (e.g., a pencil or nail) to enable measurements and/or other useful tasks to be performed in other contexts. In some cases, the nail or pencil may simply be taped or held at or near the end hook 170. However, in some cases, an attachment (e.g., a transverse slot, clip, etc.) may be provided to interface with the end hook 170 and also with the nail, pencil or other time. Thus, example embodiments may provide the ability for the operator to configure the end hook 170 to interface with a functional device (e.g., an anchor or writing tool) that acts transverse or perpendicular to the direction of longitudinal extension of the blade 140 so that the end hook 170 can be anchored or make markings at the end hook 170 location. This may allow marking or measuring on surfaces (e.g., walls, floors, ceilings, etc.) that are planar, and that have a reference point on the plane from which (or to which) measuring is desired. Instead of running the blade 140 over the surface such that the blade 140 is substantially parallel to the surface (or such that the apex of the cupped portion of the blade 140 is closest to the surface), the blade 140 may be run out over the surface such that the blade 140 is substantially perpendicular to the surface (e.g., such that one wing of the blade 140 is adjacent to the surface and the other wing is distally located relative to the surface).

In accordance with some example embodiments, the ability to either anchor the end hook 170 or have a writing tool placed proximate to the end hook 170 may be even more useful if there is also an anchoring point that can be defined at a portion of the housing 110. However, for maximum utility, the anchoring point associated with the housing 110 should also act substantially perpendicular to the direction of longitudinal extension of the blade 140. Moreover, in some cases, the anchoring point may also be disposed a known distance from the aperture 150 and in-line with the blade 140 as it extends from the aperture 150. Accordingly, a transverse aperture 180 may be disposed in the housing a known distance (A) from the aperture 150 and pass through the housing 110 in a direction that is parallel to the axis of the reel assembly 120 on which the blade 140 is wound (i.e., the drum of the reel assembly 120). However, the transverse aperture 180 may also be positioned in alignment with the blade 140 as the blade 140 is extended from the aperture 150. As such, a line 182 is collinear (and coplanar) with the blade 140 as the blade 140 extends through the aperture 150 and passes through an axis of the transverse aperture 180. This ensures that the distance (A) is accurate since any other positioning could create a misalignment that would render any distance measurements inaccurate.

Of note, due to the positioning of the reel assembly 120 and the blade 140 within the housing 110, the location of the transverse aperture 180 proximate to a distal end of the housing 110 relative to the aperture 150 (i.e., at the heel portion 175) may be advantageous since no other location permits alignment of the transverse aperture 180 with the blade 140 as the blade 140 extends from the housing 110 (via the aperture 150) while avoiding interference with other internal components of the measuring tape device 100. Thus, the axis of the transverse aperture is also coplanar with the blade 140, as the blade 140 is extended from the aperture 150. The placement of the transverse aperture 180 in the heel portion 175 may therefore enable a number of different configurations or uses, some of which are shown in FIGS. 3A, 3B and 3C.

In this regard, FIG. 3A illustrates a configuration in which the blade 140 is extended from the housing while a marking device 190 is affixed to the blade 140 (or the end hook 170), and a nail 192 or other fastener/anchoring device is passed through the transverse aperture 180 to affix the housing 110 to a surface. The housing 110 is therefore pivotally attached to the nail 192 to rotate about the anchor point defined on the surface by the nail 192. The blade 140 extends from the housing 110 (and can be locked at a particular length by the locking assembly 160) so that the marking device 190 draws an arc 194 of a fixed length relative to the anchor point on the surface. Of course, the arc 194 could be extended to define an arc of any length, including defining a half circle or full circle on the surface. Additionally, multiple concentric circles with different diameters can be easily drawn using the same anchor point, and extending the blade 140 to different desired and precise lengths. This can be particularly useful for cutting plywood or drywall to define arches, or for laying out curved designs for patios, gardens, etc.

In FIG. 3B, the measuring tape device 100 is shown in a storage configuration. In this regard, for example, the nail 192 (or some other fastener/anchoring device) may be passed through the transverse aperture 180 and into the surface. The measuring tape device 100 can therefore be stored and displayed for improved organization and accessibility. The housing 110 may then be retained or suspended from the nail 192 until removed from engagement with the nail 192. In this or any other configuration involving the nail 192, if the nail 192 has a head that is wider than the diameter of the transverse aperture 180, then the nail 192 must be withdrawn from the surface to release the housing 110. However, if the nail 192 has a head that is narrower than the diameter of the transverse aperture 180, then the nail 192 need not be withdrawn from the surface in order for the housing 110 to be alternately pivotally attached to the nail 192 and withdrawn from engagement therewith.

FIG. 3C illustrates yet another possible configuration (among many possible configurations) where measurements or markings may be made along the surface. In this regard, for example, the nail 192 may be inserted through the transverse aperture 180 and into the surface. Thereafter, the blade 140 may be extended from the housing 110 to another anchor point (e.g., nail 196) inserted into the surface at a point some distance (i.e., a distance equal to A plus the amount of blade 140 extended from the aperture 150) away from the nail 192 and the transverse aperture 180. The blade 140 may extend along a straight line from the anchor point defined by the nail 192 to define the blade 140 as a straight edge. A level (either on the housing 110 or as a separate device) may be used to level the straight edge formed by the blade 140 in some cases. However, regardless of whether leveling is desired, the blade 140 may extend along the surface such that various markings may be made along the straight edge formed by the blade 140 at respective desired distances. In particular, the blade 140 could be extended to significant lengths by one individual (anchoring respective opposing ends of the blade 140) and then individual measured points at any location along the blade 140 can be marked by the same individual. Alternatively or additionally, a straight line can be traced along the length of the blade 140 in this mode.

In addition to providing a clear path through the housing to define a convenient location for anchoring the housing 110 pivotally to a surface so that arcs can be drawn, the measuring tape device 100 can be stored, or the blade 140 can function as a straight edge along the surface, the structure of the transverse aperture 180 may serve other utilitarian purposes. For example, the structure used to form the transverse aperture 180 may actually clamp a first portion 200 and a second portion 210 of the housing 110 together. In this regard, the housing 110 of some embodiments may be made from two half-shells that fit together. A first such half-shell (e.g., the first portion 200) may fit together with the second half-shell (e.g., the second housing portion 210) to define the housing 110 surrounding the reel assembly 120 and the self-retraction assembly 130. The first and second housing portions 200 and 210 may also define the aperture 150 and an opening for the locking assembly 160, along with at least one of the first or second housing portions 200 or 210 serving as an interface for a clip. In a conventional measuring tape, a number of screws may be passed through one of the first and second housing portions 200 and 210 into the other of the first and second housing portions 200 and 210 to affix them to each other and define the housing 110. However, in accordance with an example embodiment, one such screw (e.g., a screw that would otherwise have been located at the heel portion 175) may be eliminated and replaced by the transverse aperture 180.

FIG. 4 illustrates such a cross section of the heel portion 175 taken through an axis of the transverse aperture 180. As shown in the example of FIG. 4, the transverse aperture 180 may be defined by a first hole post 220 and a second hole post 230 that each extend inwardly from respective opposing portions of the first and second housings portions 200 and 210. Moreover, the first hole post 220 may have a beveled outer edge 222 that engages the first housing portion 200, while the second hole post 230 has a beveled outer edge 232 to engage the second housing portion 210. The ends of the first and second hole posts 220 and 230 opposite the beveled outer edges 222 and 232, respectively, may join each other to define the transverse aperture 180. As such, for example, the first and second hole posts 220 and 230 may be substantially identical to each other and mirror each other about a joint defined between them (or at least about a plane that divides the measuring tape device 100 in half.

In an example embodiment, a sleeve 240 may be provided at the joint between the first and second hole posts 220 and 230 to hold the first and second hole posts 220 and 230 together. Alternatively or additionally, the joint can be held together by a mechanical press-fit, a threaded interface, a swaging or crimping approach, or the like. Moreover, in some cases, the first and second hole posts 220 and 230 may be held to together (principally or secondarily) by a bonding agent or adhesive. Male and female connections or other such interfaces that are not identical may also be used. Regardless of the mechanism used, the drop impact performance of the measuring tape device 100 may be improved, while at least one screw boss may be eliminated from the design.

The beveled outer edges 222 and 232 may be replaced by any flared, tapered or other design that provides an enlarged portion that can place a holding force on the first and second housing portions 200 and 210 in alternative embodiments. However, in these alternative designs as well, the structure of the transverse aperture 180 may be such that a clamping load is provided by the first and second hole posts 220 and 230. Accordingly, for example, the beveled outer edges 222 and 232 may provide a principal or reinforcing structural clamping load to help secure the first and second housing portions 200 and 210. In an example embodiment, the diameter of the interior portions of the first and second hole posts 220 and 230 may be large enough to accommodate any standard nail (or screw) sizes. The diameter of the interior portions of the first and second hole posts 220 may also be large enough to allow standard nail or screw heads to pass therethrough in some cases, but may be too small to allow the heads to pass in other alternative designs. In any case, however, the beveled outer edges 222 and 232 may have a wider diameter than the diameter of the interior portions of the first and second hole posts 220 and 230.

In some example embodiments, the first and second hole posts 220 and 230 and/or the sleeve 240, may also provide a useful structure for supporting a lanyard (shown in dashed lines as element 245 in FIG. 5A). In this regard, the housing 110 may have a first lanyard slot 250 defined in a rear wall of the housing 110 and a second lanyard slot 260 formed in a bottom wall of the housing 110 as shown in FIG. 5A. The lanyard 245 may be passed in the first lanyard slot 250 and out the second lanyard slot 260 (e.g., passing around the sleeve 240 of the transverse aperture 180), which is shown in FIG. 5B. However, given the existence of the transverse aperture 180 within the housing 110, some embodiments may only include one or the other of the first lanyard slot 250 and the second lanyard slot 260 instead of including both. In such a case, the lanyard 245 may pass in and out of the same slot and be secured around the sleeve 240 of the transverse aperture 180.

Accordingly, as can be appreciated from the description provided above, the heel portion 145 of the measuring tape device 100, which may otherwise essentially be wasted space, can be used to great benefit by employing the transverse aperture 180 of example embodiments. The resulting measuring tape device 100 may have improved functionality, as well as efficient use of space, and improved case/housing clamping load.

In an example embodiment, a measuring tape device is provided. The measuring tape device may include a housing having an aperture, a reel assembly defining an axis, a blade having a first end configured to extend from the housing through the aperture and a second end configured to be wound on the reel assembly, and a transverse aperture extending through the housing in a direction substantially parallel to the axis.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the transverse aperture may be disposed at a heel portion of the housing. In an example embodiment, an axis of the transverse aperture may be substantially coplanar with a portion of the blade that is extended from the aperture of the housing. In some cases, the transverse aperture may be configured to receive a fastener that passes through the transverse aperture to pivotally secure the device to a surface into which the fastener is secured. In an example embodiment, responsive to securing the device to the surface via the fastener, the blade may be extendable and configured to receive a marking device at a predetermined portion thereof to define an arc with the marking device by pivoting the device about the fastener. In some cases, the marking device may be configured to be secured proximate to an end hook disposed at the first end of the blade. In an example embodiment, responsive to securing the device to the surface via the fastener, the blade may be extendable and an end hook disposed at the first end of the blade may be configured to be secured to the surface to hold the device proximate to the surface with the blade extended along the surface such that an operator can make markings along the blade without holding any portion of the device. In some cases, a diameter of the transverse aperture may be configured to be larger than a diameter of the fastener and a head of the fastener such that the device may be alternately capable of hanging on the fastener and being removed therefrom. In an example embodiment, a diameter of the transverse aperture may be configured to be larger than a diameter of the fastener and smaller than a diameter of a head of the fastener. In some cases, the housing may include a first housing portion and a second housing portion, and the transverse aperture may be configured to provide a clamping load to secure the first housing portion to the second housing portion at the heel portion. In an example embodiment, the transverse aperture may include a first beveled outer edge configured to engage the first housing portion and a second beveled outer edge configured to engage the second housing portion to apply the clamping load. In some cases, the transverse aperture may include a first hole post and a second hole post that meet at a joint. The first beveled outer edge may be disposed on the first hole post at an end thereof that is opposite the joint, and the second beveled outer edge may be disposed on the second hole post at an end thereof that is opposite the joint. In an example embodiment, a sleeve may be disposed around the joint to facilitate holding the first and second hole posts together. In some cases, the housing may include at least one slot disposed in the heel portion to enable a lanyard to be passed through the slot to be secured to the sleeve. In an example embodiment, the joint may include a mechanical press fit, a threaded interface, a swaged interface or a crimped interface. In some cases, the first hole post may include a male portion at an end thereof that is opposite the first beveled outer edge, and the second hole post may include a female portion at an end thereof that is opposite the second beveled outer edge. In an example embodiment, the first hole post and the second hole post may be joined together at the joint via a bonding agent or adhesive. In some cases, the housing may include a first slot disposed in the heel portion extending parallel to the axis to enable a lanyard to be passed through the first slot to engage the transverse aperture. In an example embodiment, the housing may include a second slot disposed at the heel portion extending parallel to the axis and to the first slot to receive the lanyard. In some cases, the first slot may be disposed at a back wall of the heel portion and the second slot may be disposed at a bottom wall of the heel portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring tape device comprising:
a housing having an aperture;
a reel assembly defining an axis;
a blade having a first end configured to extend from the housing through the aperture and a second end configured to be wound on the reel assembly; and
a transverse aperture extending through the housing in a direction substantially parallel to the axis;
wherein the transverse aperture is disposed at a heel portion of the housing;
wherein the transverse aperture is configured to receive a fastener that passes through the transverse aperture to pivotally secure the device to a surface into which the fastener is secured; and
wherein, responsive to securing the device to the surface via the fastener, the blade is extendable and configured to receive a marking device at a predetermined portion thereof to define an arc with the marking device by pivoting the device about the fastener.

2. The device of claim 1, wherein an axis of the transverse aperture is substantially coplanar with a portion of the blade that is extended from the aperture of the housing.

3. The device of claim 1, wherein the marking device is configured to be secured proximate to an end hook disposed at the first end of the blade.

4. The device of claim 1, wherein the housing comprises a first slot disposed in the heel portion extending parallel to the axis to enable a lanyard to be passed through the first slot to engage the transverse aperture.

5. A measuring tape device comprising:
a housing having an aperture;
a reel assembly defining an axis;
a blade having a first end configured to extend from the housing through the aperture and a second end configured to be wound on the reel assembly; and
a transverse aperture extending through the housing in a direction substantially parallel to the axis;
wherein the transverse aperture is disposed at a heel portion of the housing;
wherein the transverse aperture is configured to receive a fastener that passes through the transverse aperture to pivotally secure the device to a surface into which the fastener is secured;
wherein the transverse aperture is configured to receive a fastener that passes through the transverse aperture to pivotally secure the device to a surface into which the fastener is secured; and
wherein, responsive to securing the device to the surface via the fastener, the blade is extendable and an end hook disposed at the first end of the blade is configured to be secured to the surface to hold the device proximate to the surface with the blade extended along the surface such that an operator can make markings along the blade without holding any portion of the device.

6. The device of claim 5, wherein a diameter of the transverse aperture is configured to be larger than a diameter of the fastener and a head of the fastener such that the device is alternately capable of hanging on the fastener and being removed therefrom.

7. The device of claim 5, wherein a diameter of the transverse aperture is configured to be larger than a diameter of the fastener and smaller than a diameter of a head of the fastener.

8. A measuring tape device comprising:
a housing having an aperture;
a reel assembly defining an axis;
a blade having a first end configured to extend from the housing through the aperture and a second end configured to be wound on the reel assembly; and
a transverse aperture extending through the housing in a direction substantially parallel to the axis;
wherein the transverse aperture is disposed at a heel portion of the housing;
wherein the housing comprises a first housing portion and a second housing portion, and wherein the transverse aperture is configured to provide a clamping load to secure the first housing portion to the second housing portion at the heel portion.

9. The device of claim 8, wherein the transverse aperture comprises a first beveled outer edge configured to engage the first housing portion and a second beveled outer edge configured to engage the second housing portion to apply the clamping load.

10. The device of claim 9, wherein the transverse aperture comprises a first hole post and a second hole post that meet at a joint, wherein the first beveled outer edge is disposed on the first hole post at an end thereof that is opposite the joint, and wherein the second beveled outer edge is disposed on the second hole post at an end thereof that is opposite the joint.

11. The device of claim 10, wherein a sleeve is disposed around the joint to facilitate holding the first and second hole posts together.

12. The device of claim 11, wherein the housing comprises at least one slot disposed in the heel portion to enable a lanyard to be passed through the slot to be secured to the sleeve.

13. The device of claim 10, wherein the joint comprises a mechanical press fit, a threaded interface, a swaged interface or a crimped interface.

14. The device of claim 10, wherein the first hole post comprises a male portion at an end thereof that is opposite the first beveled outer edge, and the second hole post comprises a female portion at an end thereof that is opposite the second beveled outer edge.

15. The device of claim 10, wherein the first hole post and the second hole post are joined together at the joint via a bonding agent or adhesive.

16. A measuring tape device comprising:
- a housing having an aperture;
- a reel assembly defining an axis;
- a blade having a first end configured to extend from the housing through the aperture and a second end configured to be wound on the reel assembly; and
- a transverse aperture extending through the housing in a direction substantially parallel to the axis;
- wherein the transverse aperture is disposed at a heel portion of the housing;
- wherein the housing comprises a first slot disposed in the heel portion extending parallel to the axis to enable a lanyard to be passed through the first slot to engage the transverse aperture;
- wherein the housing comprises a second slot disposed at the heel portion extending parallel to the axis and to the first slot to receive the lanyard.

17. The device of claim 16, wherein the first slot is disposed at a back wall of the heel portion and the second slot is disposed at a bottom wall of the heel portion.

* * * * *